July 1, 1952

H. H. ZWEMKE 2,601,818

POWER-OPERATED DISK TILLER

Filed Jan. 6, 1949

Herbert H. Zwemke
INVENTOR.

BY Clarence A. O'Brien
and Harvey B. Jacobson
Attorneys

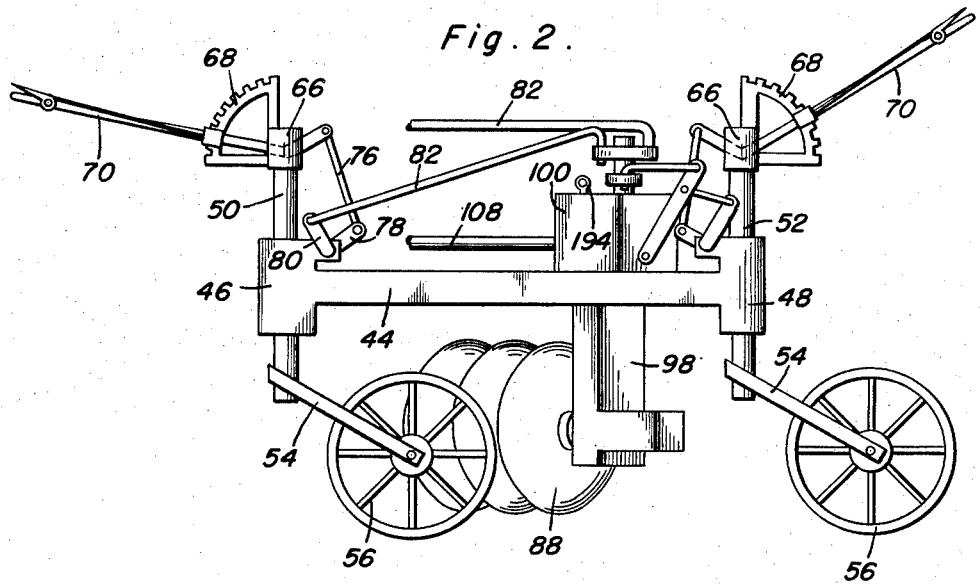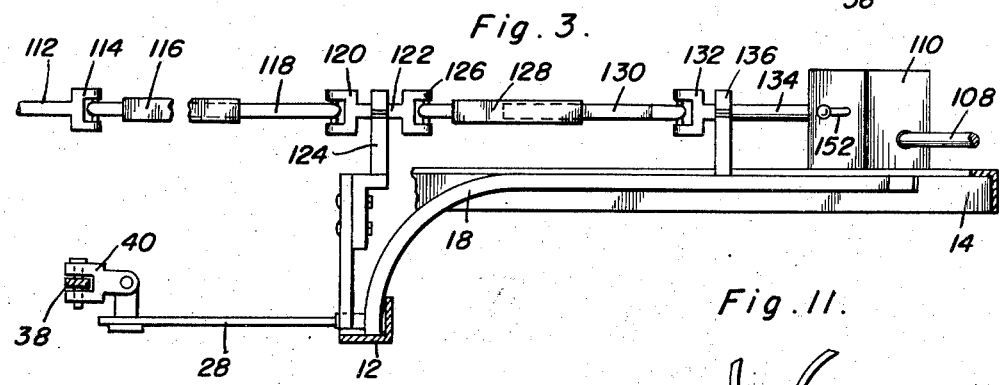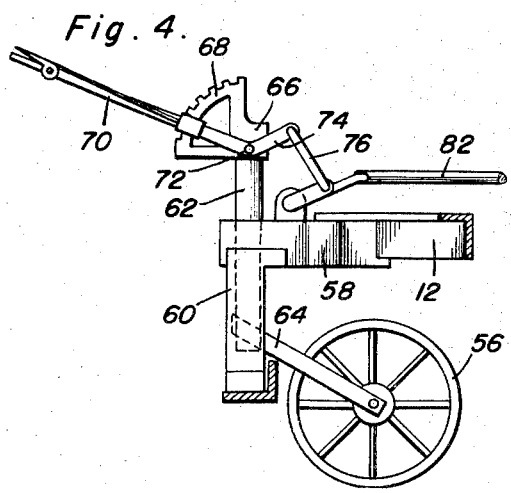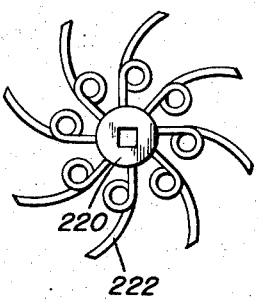

Herbert H. Zwemke
INVENTOR.

July 1, 1952 H. H. ZWEMKE 2,601,818
POWER-OPERATED DISK TILLER
Filed Jan. 6, 1949 4 Sheets-Sheet 4
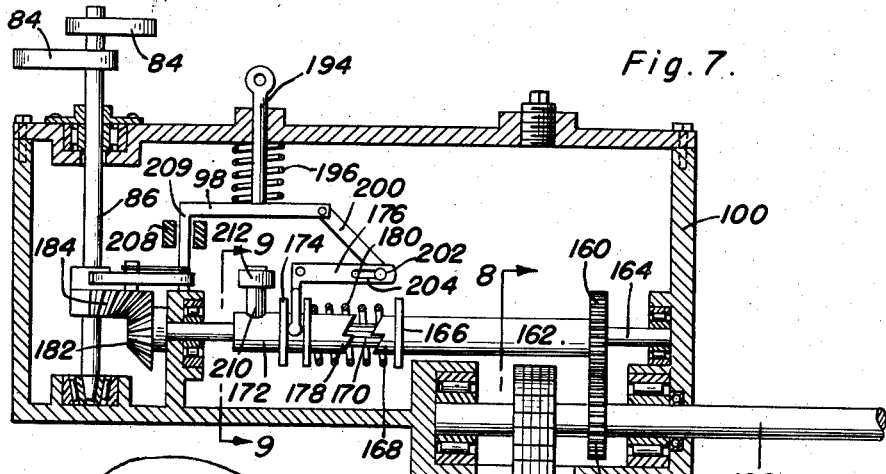
Fig. 7.
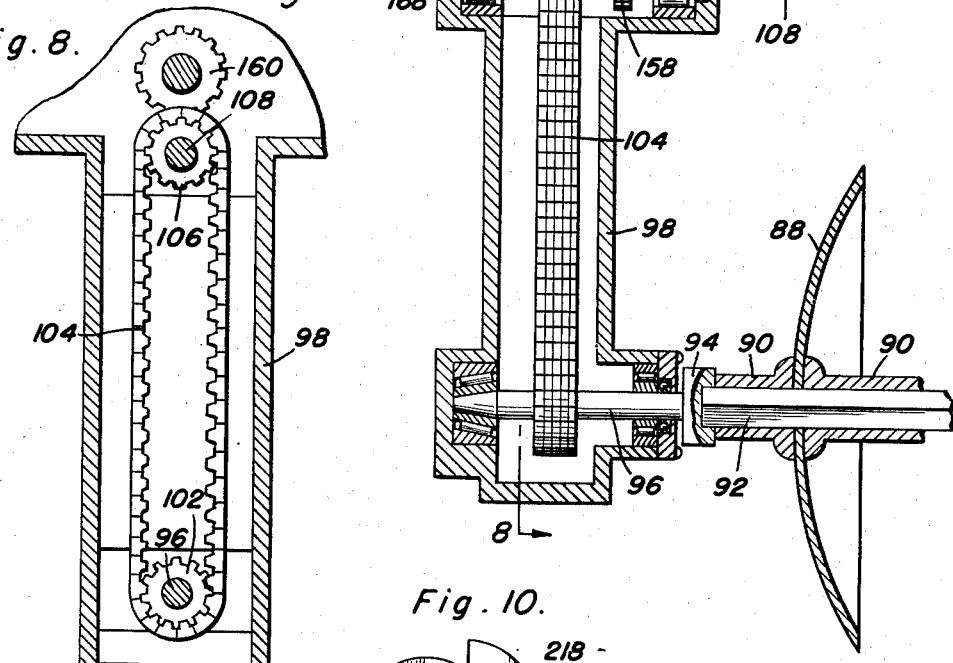
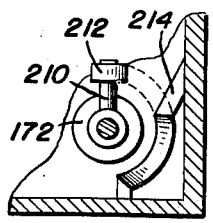
Fig. 9.
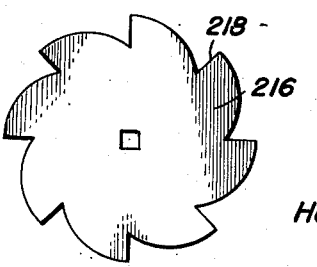
Fig. 10.
Herbert H. Zwemke
INVENTOR.
BY *Thomas A. O'Brien*
and *Harvey B. Jacobson*
Attorneys Patented July 1, 1952

2,601,818

UNITED STATES PATENT OFFICE 2,601,818

POWER-OPERATED DISK TILLER

Herbert H. Zwemke, Kolin, Mont.

Application January 6, 1949, Serial No. 69,553

3 Claims. (Cl. 97—37)

This invention comprises novel and useful improvements in a power operated disk tiller and more specifically pertains to an agricultural implement which is coupled to and drawn by the draw bar of a tractor, which is provided with a gearing assembly for operating the tiller disk assembly from the power take-off of a tractor, and which is provided with power operated means for vertically adjusting the disk assembly relative to the frame of the device by means of power obtained by the power take-off of the tractor.

The primary object of this invention is to provide a disk tiller wherein the disk assembly may be operated by power obtained from the tractor independently of the movement of the tractor drawn implement; and at various selected speeds as desired by the operator.

A further important object of the invention resides in the provision of a device as set forth in the preceding paragraph and further aims to provide the power operated means for raising or lowering the tiller disk assembly by means of power obtained from the power take-off of a tractor.

An important feature of the invention consists in the provision of a tiller framework which may be selectively coupled to and carried by the draw bar of a tractor in various vertically and horizontally adjusted positions with respect thereto.

And a further feature of the invention lies in the provision of an implement as set forth in the preceding features and objects wherein the frame of the implement is mounted upon a plurality of supporting wheels which are individually adjustable vertically with respect to the frame for selectively supporting the latter in various positions of adjustment.

A still further feature of the invention envisions the provision of an apparatus as set forth in the foregoing objects and features wherein a tiller disk assembly is rotatably carried by and depends from the frame of the device, which tiller disk assembly is operated by a gearing assembly from the power take-off of the tractor.

Still another important feature of the invention resides in providing an apparatus as set forth in the foregoing features and objects wherein there is provided a manually adjustable change speed gearing assembly interposed in the gearing assembly operated by the power take-off of the tractor for thereby selectively varying the speeds of rotation of the tiller disk assembly.

An additional important feature of the invention resides in the provision of a device in conformity with the foregoing objects and features wherein there is provided an operating connection between the gearing assembly and mechanism for simultaneously adjusting each of the vertical adjusting means of the supporting wheels of the device.

And a final important feature and object of the invention to be specifically numerated herein resides in the provision of a device as set forth in the above mentioned objects and features, wherein automatic means is provided for stopping further operation of the vertical adjusting means by the power operating means after a predetermined movement thereof; and wherein individual manual adjusting means are provided for varying the range of movement of each of the vertical adjusting means of the individual supporting wheels.

These, together with various ancillary features and objects of the invention which will later become apparent as the following description proceeds, are attained by this device, a preferred embodiment of which has been illustrated by way of example only in the accompanying drawings, wherein:

Figure 1 is a top plan view of a preferred embodiment of the invention;

Figure 2 is a side elevational view of the embodiment shown in Figure 1 and taken from the right end thereof substantially from the plane of the vertical section line indicated at 2—2 in Figure 1;

Figure 3 is a longitudinal sectional detail view taken substantially upon the plane of the vertical section line 3—3 of Figure 1;

Figure 4 is a further longitudinal sectional detail view taken substantially from the plane of section line 4—4 of Figure 1;

Figure 7 is a vertical longitudinal sectional detail view taken substantially upon the plane of the section line 7—7 of Figure 6;

Figure 8 is a fragmentary vertical sectional detail view taken substantially upon the plane of section line 8—8 of Figure 7;

Figure 9 is a fragmentary vertical sectional detail view taken substantially upon the plane of section line 9—9 of Figure 7;

Figure 10 is a side elevational view of a modified or alternative form of disk construction which may be employed to make up the tiller disk assembly; and, Figure 11 is a side elevational view of a still further embodiment of this element which may be employed in the tiller disk assembly.

Figure 5:
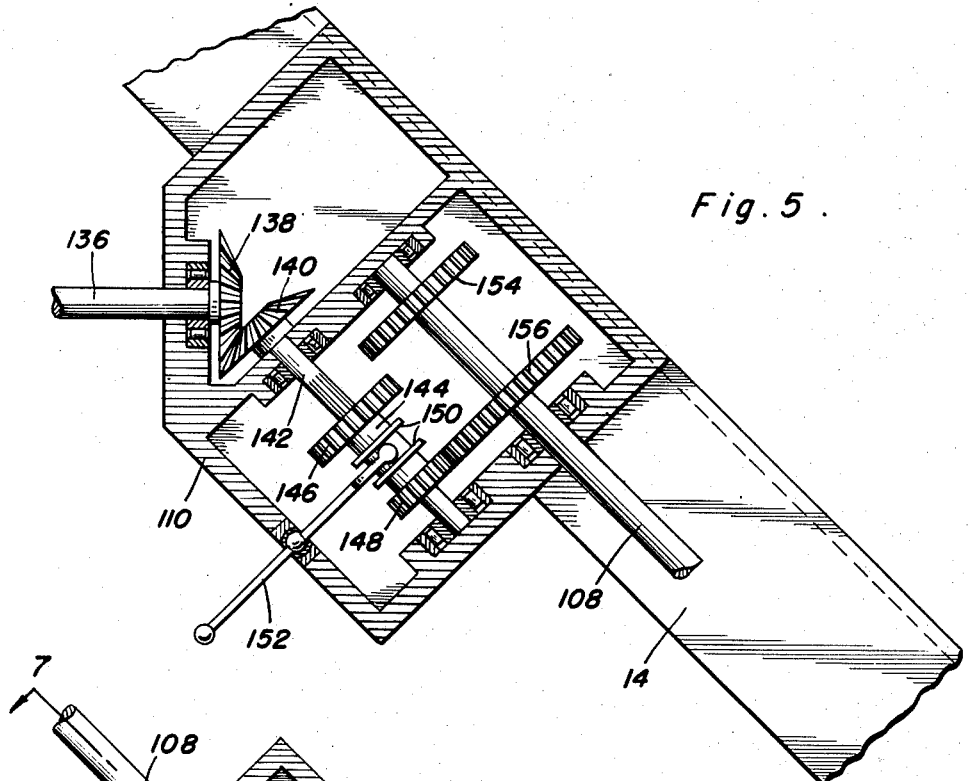
Figure 5 is a fragmentary horizontal sectional view through the change speed gearing assembly of the invention.

Referring now more specifically to the accompanying drawings, wherein like numerals designate similar parts throughout the various views, attention is directed first and chiefly to Figure 1, together with Figures 2–4, wherein 10 designates generally the framework of a disk tiller agricultural implement and which frame may be of any desired construction but preferably comprises a transversely disposed frame member 12 and angularly and rearwardly disposed rear frame member 14, secured to the transverse front frame member 12 as by a plurality of longitudinal frame members such as indicated at 16 and 18, all of which frame members are joined into a rigid and durable structure as by reinforcing bars 20.

As will be more clearly seen by reference to Figure 3, the front frame member 12 and the angularly disposed rear frame member 14 are spaced vertically with respect to each other, and the connecting reinforcing members 16 and 18 are correspondingly curved to rigidly connect the frame members, such curvature being indicated at 18 in Figure 3. By means of a plurality of appropriately spaced apertures 22 in the front or transverse frame member 12, the frame 10 may be adjustably engaged by the screw threaded bolt portions of eye bolts 24 which in turn are connected to the forked ends 26 of parallel arms 28, these arms being rigidly attached to each other as by cross bracing 30. At their forward end, are connected by an arcuately extending bar 32, which bar in turn is provided with a plurality of appropriately spaced apertures 34.

The members 28, 30 and 32 thus constitute a rigid assembly which is pivotally connected by the eyebolts 24 to the transverse member 12, to constitute a tongue or draw bar which is vertically pivoted to the frame 10.

This draw bar assembly or tongue of the frame 10 is in turn detachably connected to a transversely disposed bar or plate 36 constituting a portion of the draw bar assembly with which a tractor is customarily provided. This transverse plate 36 is provided with a plurality of spaced apertures 38, which are selectively engaged and pivotally received forks or yokes 40 which in turn are pivotally connected to eye bolts 42 selectively received in the apertures 34. By means of this arrangement, the tongue assembly of the frame 10 may be adjusted laterally with respect to the draw member 36 originally carried by the rear end of a tractor, whereby the tongue is pivotally connected for movement in both a vertical and horizontal plane with respect to the draw bar member 36.

At the rearmost end of the frame member 14, there is provided a longitudinally extending and rigidly attached frame member 44. The front and rear ends of the member 44 are provided with vertically disposed tubular journals or bosses 46 and 48 respectively in which are slidably disposed vertically movable shafts 50 and 52. The lower ends of these shafts extending below their guide journals or bosses 46 and 48, and having rigidly attached forks 54, at the lower ends of which are journalled supporting wheels 56 which thus support the rear end of the implement frame.

The front end of the frame member 14, and the adjacent end of the transverse member 12, are connected with a plate or block 58 which likewise is provided with a vertically disposed boss 60, in which is slidably disposed a vertically movable shaft 62 which adjacent its lower end is provided with a rigidly attached fork 64 journalling a supporting wheel 66.

It should be here noted that each of the vertically disposed shafts 50, 52 and 62 are vertically slidable and adjustable in their respective bosses in a manner set forth hereinafter, and are freely rotatable in said bosses in the selected position of adjustment, whereby the wheels 56 may thus function as castor wheels.

Each of these vertical shafts may be adjusted simultaneously by a common power operated adjusting means, and may also individually manually be adjusted by a mechanism which thus determines the range of movement which may be imparted by the power operated adjusting means to each of the castor wheels, or which may be selectively employed to effect an individual adjustment as desired.

For this purpose, each of the shafts is provided with a cap or head piece 66 which is secured to the upper end of this respective shaft for free rotary movement thereon, but is in any suitable manner secured to the shaft to prevent endwise displacement relative thereto. Thus, although the cap member 66 are non-rotatable with respect to the frame 10, the shafts 50, 52 and 62 are freely swivelled therein throughout their various positions of vertical adjustment.

Integrally formed upon, or if desired rigidly attached by any desired mechanical means to the caps or head pieces 66, are quadrant shaped arcuately toothed members 68 constituting racks for receiving the customary holes or detents, of any known construction and hence not illustrated in the drawings, by means of which manual adjusting levers 70, pivoted at 72 to the cap pieces 66, may be selectively secured in various positions of adjustment.

Integrally or rigidly attached to the lever 70, are lever arms 74 which are pivoted to connecting links 76 which in turn are connected with one arm 78 of a bell crank suitably journalled in the various tubular bosses 46, 48 and 60, the other arm 80 of this bell crank being connected to a rod 82. As will readily be seen by reference to Figures 2, 4 and 1, the manual levers 70, the bell crank assemblies, and the above described connecting linkages, are all identical in construction, and each of the rods 82 is connected to crank arms 84 carried by a power operated vertically disposed adjusting shaft 86.

As will thus be seen, upon operation by a power means to be subsequently described, the shaft 86 will simultaneously operate each of the rods 82, and by the associated linkages will rotate the bell crank assemblies. With the individual levers 70 in their adjusted and consequently fixed positions, one arm of each bell crank assembly is thus provided with a fixed fulcrum, whereby the bell crank assembly which is pivoted as above mentioned to its respective tubular boss or journal assemblies 46, 48 and 60, will cause a vertical movement of the latter with respect to the respective shafts 50, 52 and 62, thereby raising or lowering the frame 10 with respect to the supporting wheels 56. Thus, the entire frame may be raised or lowered by the power operated means to be subsequently set forth, this adjusting movement being simultaneously and equally performed at each of the supporting wheels of the device. In addition, the levers 70 may be individually adjusted, to thereby vary the range movement of each of the adjusting mechanisms for the individual wheels, thus greatly facilitating the ease of adjustment of the device and its adaptation to particular uses and surface contours of the ground to be worked.

Attention is next directed more specifically to Figures 1, 2 and 7, wherein there is shown a rotatable tiller disk assembly comprising a plurality of disks 88 of any desired shape, which are spaced as by spacing sleeves or collars 90 interposed therebetween, which disks and sleeves are secured upon a tiller disk assembly shaft 92 preferably of square cross section, a plurality of these disks and spacer sleeves comprising a tiller disk assembly of any desired length, one end of the assembly being rotatably supported in any suitable manner by a bearing, not shown, depending from the forward end of the rear frame member 14, while the other end is journalled to the rear end of the frame member.

As shown in Figure 7, the other end of the tiller disk assembly shaft 92 is socketed removably in a socket 94 carried by the external end of a driving shaft 96 suitably journalled transversely at the lower end of a hollow casing or housing 98 depending from and merging with the lower end of a gear assembly casing 100, which is suitably carried by and supported by the frame member 44.

As will thus be readily understood, by releasing the other end of the shaft 92, its end may be detached from the socket member 94, whereby the tiller disk assembly may be removed for repairs, servicing, or for replacement of the disks 88 by any other type of disk desired.

By means of a sprocket gear 102 carried by the shaft 96, a sprocket chain 104 received in the housing 98, and entrained over the sprocket 102 and over a similar sprocket 106 carried by a power transmission shaft 108, which is journalled in the gear casing 100 and extends therefrom, the tiller disk assembly is rotated as set forth hereinafter.

The power shaft 108 extends from the gear casing 100, as shown in Figure 1, into a variable speed casing 110 suitably mounted upon the frame member 14. Power is applied to the change speed gear casing assembly 110 from the power take-off of the tractor in the following manner.

As shown best in Figure 1, a shaft 112 which may constitute the power take-off shaft of the tractor, or a shaft driven thereby, is utilized to impart power to the gearing assembly of this device. This shaft 112 is connected by universal joint coupling 114 of any suitable design, with a female shaft 116 in which is slidably but not rotatably received a male shaft 118 provided with a further universal joint coupling 120, by means of which the latter is attached to a stub shaft 122 journalled in a bracket or pedestal support 124 secured to the frame member 12.

The rear end of the shaft 122 is in turn secured to a universal joint 126 carried by a tubular female member 128 which is non-rotatably but slidably connected with a male member 130 in turn carrying a universal joint 132, whereby the member 130 is secured to a driven shaft 134 journaled in a suitable bracket or bearing 136.

The shaft 134 extends into and constitutes the driving shaft of the gearing assembly contained in the changed speed gearing housing 110.

As will be readily seen by reference to Figure 5, the shaft 136 extends into and is journalled in the wall of the casing 110, and at its inner end is provided with a bevel gear 138 which constantly meshes with a similar bevel gear 140 carried by a lay shaft 142. Slidably but non-rotatably splined upon the lay shaft 142 is a change speed gearing assembly sleeve 144, which is provided with integrally disposed and longitudinally spaced high and low speed gears 146 and 148 respectively. The sleeve 144 is provided with a pair of parallel collars or flanges 150 between which is received the end of the operating lever 152 which may be manually operated in any suitable manner for shifting the change speed gear sleeve 144. As will thus be readily understood, the sleeve 140 may be shifted to selectively engage either the high or low speed gears 146 and 148 with the corresponding high and low speed gears 154 and 156 respectively carried by the above mentioned power shaft 108 which is journalled within the casing 110. By this means, it will be readily seen that power is supplied from the power take-off of tractor, under the control of the change speed gearing assembly 110, to the power shaft 108.

Figure 6:
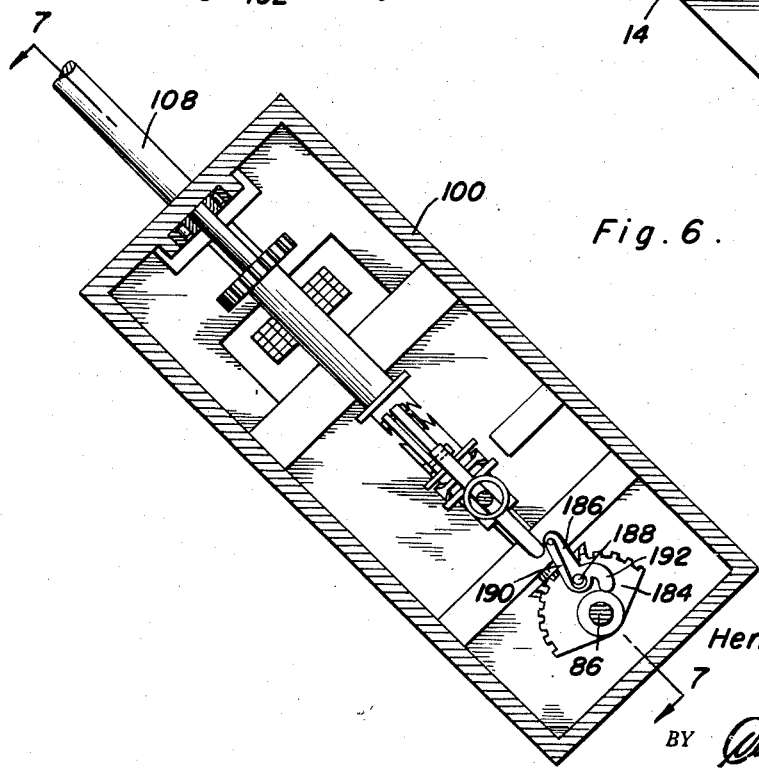
Figure 6 is a fragmentary horizontal sectional detail view through the gearing assembly connecting the tiller disk assembly driving means with the gearing assembly of the device.

Attention is now directed more specifically to Figures 6 and 7 for an understanding of the construction of the gearing assembly housed in the casing 110. The power shaft 108 extending thereinto is provided with a spur gear 158 which constantly meshes with a similar spur gear 160 carried by a sleeve 162 which is freely rotatable upon a lay shaft 164 suitably journalled in the casing 100. The sleeve 162 is provided with a collar 166 for a purpose to be later described, and terminates in clutch jaws 168 forming part of a manually engageable clutch assembly to be subsequently described. It will thus be seen that the sleeve 162 is continuously rotated during the entire operation of the power shaft 108, while the tiller disk assembly shaft 92 is likewise continuously rotated at the same time.

The shaft 164, beyond the end of the sleeve 162, is provided with a splined portion 170 upon which is slidably but non-rotatably received a sleeve 172 provided with an angular grooved or flanged portion 174 which is engageable by the forked end of a bell crank 176 suitably pivoted to the casing 100. The end of the sleeve 172 and casing sleeve 162 is provided with clutch jaws 178 which are selectively engageable with the jaws 168 when the sleeve 172 is biased by the bell crank 176 into engagement with the sleeve 162. The two sleeves are yieldingly urged apart as by the spring 180 which is seated between the flange 166 on the sleeve 162 and the collar or flange 174 on the sleeve 172.

It will thus be seen that when the sleeve 172 is urged into engagement with the sleeve 162 by a means to be subsequently described, that the shaft 164 by means of the splines 170 is operatively connected to the sleeve 162 for operation thereby.

At its outer end, the lay shaft 164 is provided with a bevel gear 182 which is continuously in mesh with a similar bevel gear 184 which if desired may be a segmental gear, and which is rigidly secured to the shaft 86 above mentioned which by means of the crank arms 84 operates the rods 82 for adjusting the supporting wheels relative to the frame.

As will be best understood by reference to Figure 6, the segmental gear 184 has pivoted thereto a latch or stop 186 by means of a pivot pin 188, a spring 190 serving to yieldingly bias the arm 192 of the latch against the sleeve or hub portion of the gear 184, to thus limit movement of the latching member 186 in one direction.

A common control member consisting of a rod or shaft 194 slidably extends through a removable cover of the gear casing 100 and is yieldingly urged inwardly thereof as by a coil spring 196. The inner end of the rod 194 is provided with a cross bar or arm 198, one end of which is connected by a link 200 with the above mentioned bell crank 176, as by means of a pin 202 sliding in an elongated slot 204 formed in the end of the bell crank lever. The other end of the cross bar or arm 198 is provided with an angularly disposed end portion 206 which is slidably received in the guide 208 suitably mounted in the gearing casing 100, and as shown more clearly in Figure 6, has its end movable into and out of position for engagement by the stop latch 186.

The arrangement is such that in its normal position, the rod 194 is urged inwardly by the spring 196 as shown in Figure 7, whereby the member 206 is interposed into the path of movement of the latching member 186, to thereby prevent movement of the latch, and consequently of the gear 184 and shaft 86, this arrangement preventing rotation of the shaft 86 in a direction which would lower the adjustment of the frame of the tiller disk assembly relative to the supporting wheels. At the same time, the clutch assembly including the bell crank 176 and the sleeve 172 is urged to its outer position by means of the spring 170. When now the member 194 is activated by any suitable mechanism not shown, against the opposition of the spring 196, the first portion of this movement is effective to withdraw the locking member 206 from engagement with the latch 186, thereby freeing the shaft 86 so that the latter may be rotated by the weight of the tiller disk assembly through the various connecting linkages, to lower the frame and the tiller disk assembly to their lowermost positions of adjustment. Upon further outward movement of the rod 194, the link 200 and the bell crank 176 are now actuated, the loss motion afforded by the slot 204 and the pin 202 being now taken up, so that the sleeve 172 is moved upon the splined portions 170, into engagement with the clutch jaws 168, whereby the lay shaft 160 is now rotated by the continuously rotating stub shaft 108. This rotation thus actuates the sector gear 184, causing rotation of the shaft 86 in a direction to elevate the frame and the tiller disk assembly relative to the supporting wheels. In this direction of rotation of the shaft 86, the latch 186 is free to pass the withdrawn locking pin 206; for if the latter has been returned the latch can yield and still pass the locking pin in the elevating movement of the shaft 86.

In order to prevent undue movement or excessive movement in the elevating action of the device, a laterally disposed arm 210 is carried by the sleeve 172 and is provided with an anti-friction roller 212 thereon. As shown in Figures 7 and 9, this arm and roller 210 and 212 are so placed with respect to the position of the gear 184, that the roller is engageable with a fixed camming surface 214 carried by any suitable portion of the gear casing 100 whereby upon predetermined movement of the shaft 86, the camming action of the surface 200 upon the roller and arm 210 will cause a sliding movement of the sleeve 172 upon the splined portion 170 of the lay shaft 164, against the action of the frictional or other resistance of the rod 194 and its associated linkage, to thus return the clutch members to their inoperative position, and to again position the stop member 206 in the path of the travel of the latch 186.

It will thus be seen that by manipulation of the rod 194, the frame 10 may be selectively raised or lowered with respect to its supporting wheels, thereby permitting disengagement of the tiller disk assembly from the soil, and permitting easy return of the device into its working position.

It should be here noted that it is not intended to limit the principles of the invention to the particular construction of disks 88 previously described. Instead, various other constructions of disks may be employed either in conjunction with the form of disks 88, or as a complete replacement therefor, and one such satisfactory form has been illustrated in Figure 10, as comprising a disk 216 provided with a plurality of saw teeth 218 whereby the disk is capable of cutting and breaking hard or clay soils, or surfaces not heretofore broken for cultivation.

As a still further alternative type of disk, attention is directed to the showing of Figure 11, wherein there is disclosed a disk consisting of a hub portion 220 which is receivable interchangeably with the other disks previously described with the shaft 92 of the tiller disk assembly, which hub portion is provided with a plurality of radiating, spring steel teeth 222. These resilient teeth are adapted to yieldingly penetrate cultivated soil, thereby working stubble or the like towards the surface of the ground to provide a mulch or covering therefor.

From the foregoing, the various uses and advantages of the device will be readily understood and further explanation is believed to be unnecessary. However, since numerous changes will readily occur to those skilled in the art after a consideration of the foregoing drawings and accompanying description, it is not intended to limit the invention to the exact construction shown and described, but all suitable modifications and equivalents may be resorted to falling within the scope of the appended claims.

Having described the invention, what is claimed as new is:

1. A power operated disk tiller comprising a tiller frame, a tiller disk assembly journaled on said frame, a plurality of supporting wheels mounted on said frame, fastening means for securing said frame to the drawbar of a tractor, a gearing assembly operatively connecting said tiller disk assembly to the power take-off of a tractor, said gearing assembly continuously connects said tiller disk assembly to said power take-off, a control means for simultaneously vertically adjusting all of said supporting wheels relative to said frame, and means for powering said control means from said gearing assembly, said last means including a manually operable clutch connecting said gearing assembly and said control means, a stop latch limiting operation of said control means, means connecting said manually actuated clutch to said stop latch for synchronized movement therewith.

2. A power operated disk tiller comprising a tiller frame, a tiller disk assembly journaled on said frame, a plurality of supporting wheels mounted on said frame, fastening means for securing said frame to the drawbar of a tractor, a gearing assembly operatively connecting said tiller disk assembly to the power take-off of a tractor, said gearing assembly continuously connecting said tiller disk assembly to said power take-off, a control means for simultaneously vertically adjusting all of said supporting wheels relative to said frame, and means for powering said control means from said gearing assembly, said last means including a manually operable clutch connecting said gearing assembly and said control means, a stop latch limiting operation of said control means, means connecting said manually actuated clutch to said stop latch for synchronized movement therewith, and a clutch release mechanism for disengaging said manually operable clutch after predetermined movement of said control means.

3. A power operated disk tiller comprising a tiller frame supported by wheels, a tractor power take-off shaft journaled in a pedestal support mounted on said frame, a change speed gearing housing having an antifriction bearing substantially in alignment with said pedestal support and mounted on said frame, a driven shaft connected at one end to the take-off shaft by means of a universal joint and journaled near its other end in the said anti-fraction bearing, a second power shaft journaled at one end in said change speed gearing housing and operatively associated with said driven shaft through a change speed gear train within said housing, said second power shaft journaled at its other end in a second housing, said second housing mounted on said frame and including means selectively operable by said power shaft to raise and lower said supporting wheels with respect to said frame, and means providing a direct drive for operatively connecting said second power shaft and said disk tiller.

HERBERT H. ZWEMKE.

REFERENCES CITED

The following references are of record in the file of this patent:

UNITED STATES PATENTS

| Number | Name | Date |
| --- | --- | --- |
| 743,535 | Martin | Nov. 10, 1903 |
| 1,740,321 | Vasconcellos | Dec. 17, 1929 |
| 1,928,952 | Silver | Oct. 3, 1933 |
| 2,063,584 | Collins | Dec. 8, 1936 |
| 2,312,424 | Lentz | Mar. 2, 1943 |
| 2,314,041 | Gurries | Mar. 16, 1943 |
| 2,344,271 | Scott et al. | Mar. 14, 1944 |
| 2,490,688 | Hill | Dec. 6, 1949 |

FOREIGN PATENTS

| Number | Country | Date |
| --- | --- | --- |
| 306,113 | Germany | June 18, 1918 |